United States Patent Office 3,843,406
Patented Oct. 22, 1974

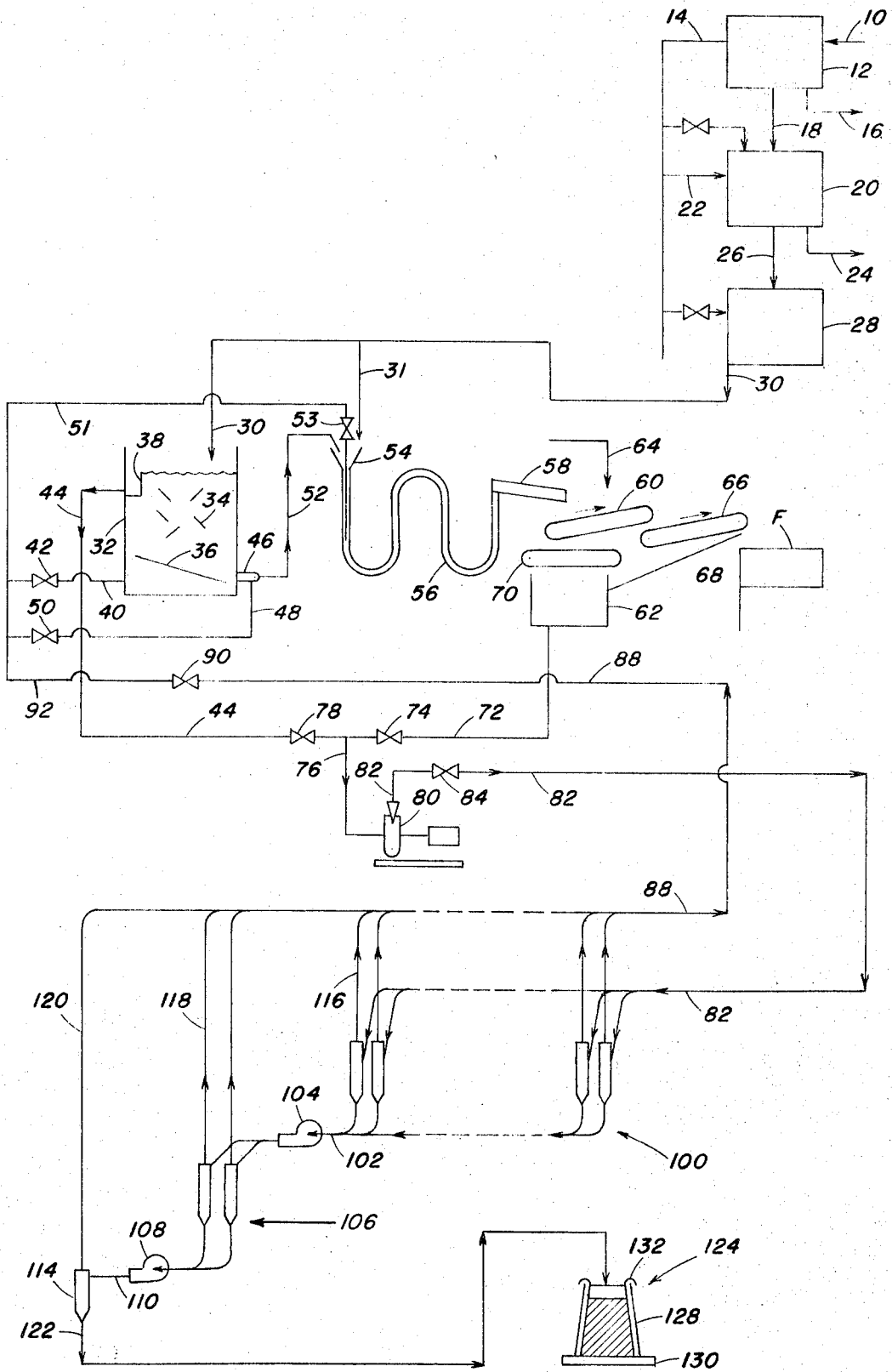

3,843,406
PROCESS AND APPARATUS FOR TREATING
SOLIDS ENRICHED WASH LIQUIDS
Edward S. Wright, Pittsburgh, Pa., and John W. Angstadt
and Otto C. Krolopp, Williamsville, N.Y., assignors to
Blaw-Knox Food and Chemical Equipment, Inc.,
Buffalo, N.Y.
Filed Feb. 9, 1972, Ser. No. 224,698
Int. Cl. C13l 1/00
U.S. Cl. 127—27                                   14 Claims

ABSTRACT OF THE DISCLOSURE

A process and apparatus for substantially reducing wash liquid requirements for the washing of raw particulate comestible materials, particularly potato slices to remove surface strach prior to cooking such slices. Washing of the slices is effected in an elongated zone having an upwardly extending portion wherein the potato slices are passed in concurrent contact with wash water to remove starch exposed during slicing of raw whole potatoes. The potato slices are separated from a starch-enriched wash liquid and are passed to a deep-fat cooking fryer. The starch-enriched liquid is passed through a plurality of concentration zones to form a concentrated starch slurry with the lean wash liquid being returned to the washing process. The concentrated starch slurry is introduced into a lined settling zone. After a period of time, additional wash liquid is decanted and the frame of the settling zone removed thereby resulting in a "cast-in-place" block of starch enclosed in the lining material.

BACKGROUND OF THE INVENTION

This invention relates to the washing of comestible materials, and more particularly to the washing of starch from raw potato slices and the subsequent treatment of the wash liquid to minimize wash liquid requirements and to recover starch in blocked form.

Presently, potatoes being prepared for processing to produce potato chips are sliced, washed and passed to the deep-fat fryer. The wash liquid, usually water, contains a significant quantity of starch which is generally disposed of by passing the wash liquid to sewage after treatment in a system employing large vats with mechanical agitators and flow action devices which require daily dismantling of various parts for manual shoveling of residual starch. It is well known that starch is deleterious to most sewage systems, since a solution thereof has a high BOD (biological oxygen demand) level which requires a higher concentration of oxygen together with greater concentration of aerobic microorganisms to effectively digest materials passed to a sewage system together with a starch-enriched water liquid stream. In many locales, a manufacturer of potato chips, partially cooked french fries, etc. is required to pay the local government a special fee to pass a starch-enriched effluent from a potato washing operation to the sewage system.

OBJECTS OF THE INVENTION

It is an object of the invention to provide a novel process and apparatus for washing raw comestible materials, such as potato slices and the like, wherein fresh water requirements are substantially reduced.

Another object of the invention is to provide a novel process and apparatus for washing raw comestible materials, such as potato slices and the like, wherein the quantity of a starch in the slurry to be treated is substantially reduced.

Still another object of the invention is to provide a novel process and apparatus for washing raw comestible materials, such as potato slices and the like, wherein a highly concentrated starch in substantially solid form is recovered from a starch slurry.

These and other objects of my invention are accomplished by passing a raw particulate comestible, such as potato slices, string beans, peas, lima beans, olives and the like, through an elongated washing zone in concurrent flow to a washing liquid. The wash liquid including suspended solids, such as surface starch exposed during the slicing of potatoes, is passed in parallel and serial flow through a plurality of hydroclones from which a highly concentrated slurry of solids is withdrawn and passed to lined settling tanks. After a predetermined time period, residual wash liquid is decanted from the top of the settling tanks and returned to the process with the starch being removed in bagged or blocked form for subsequent processing. The wash liquid streams withdrawn from the hydroclones and the settling tank are recycled to upstream processing stages thereby substantially reducing fresh wash liquid requirements. Anti-foaming agents may be added to the wash liquid to control foaming.

BRIEF DESCRIPTION OF DRAWING

Further objects and advantages of the invention will become apparent upon consideration of the detailed disclosure thereof, especially when taken with the accompanying drawing illustrating a schematic flow diagram of the invention for the washing of particulate comestible material.

DETAILED DESCRIPTION OF THE INVENTION

This invention relates to copending Application Ser. No. 108,303, filed Jan. 21, 1971, now Pat. No. 3,754,468, directed to the continuous deep-fat cooking of a raw comestible, particularly potato slices, to produce a processed comestible, i.e., potato chips; and to copending Application Ser. No. 156,765, filed June 25, 1971, now Pat. No. 3,736,182, relating to a process and apparatus for washing comestible materials.

To facilitate an understanding of the present invention, the embodiment hereof will be described with respect to the treatment of raw potatoes to prepare potato slices suitable for the deep-fat cooking thereof to form potato chips, as described in such copending application, it being understood, however, that other comestibles may be treated in accordance with this invention. It wil be understood that additional valving and piping configurations are provided consistent with accepted practices in the art.

Referring now to the drawing, raw whole potatoes in line 10 are introduced in a washer 12 and contacted with wash liquid in line 14 under conditions to remove soil and like extraneous materials adhering to the whole potatoes which are removed in slurry form with water in line 16. The whole potatoes are conveyed by line 18 to peeler 20 wherein the skin or dermis of the potato is removed, generally by causing the potatoes to abrade against each other and against abrasive coatings on the bottom and periphery of the peeler 20 in the presence of wash water introduced into peeler 20 by line 22. The skin particles in slurry form are removed, as indicated, by line 24, and the thus peeled potatoes are conveyed by line 26 to a slicer 28 wherein potato slices of uniform thickness are prepared. The washer 12, peeler 20 and slicer 28, per se, do not constitute part of the invention, and are known and used by those skilled in the art.

The potato slices are conveyed from slicer 28 by line 30 to blanching tank 32 including suitable baffles 34, a perforated plate 36 and a weir 38, wherein the slices are passed in countercurrent contact with a wash liquid flowing upwardly through perforated plate 36 introduced into blanching tank 32 by line 40 under the control of valve 42. A portion of the starch exposed by the slicing operation (cell destruction) is washed from the surface of the potato slices and is withdrawn as a starch slurry from tank 32 by line 44 upon overflowing weir 38 of the tank 32. The slices fall by gravity in the tank 32 toward the perforated plate 36 and are caused to move to the outlet conduit 46 thereof wherein wash water added by line 48 under the control of valve 50 causes the potato slices to pass through line 52 to collector device 54.

Water in line 51 under the control of valve 53 is introduced into collector device 54 and together with the potato slice-slurry in line 52 are passed through washer 56, generally illustrated as a serpentine elongated tube, wherein the potato slices pass in concurrent flow to the wash liquid to further remove surface starch from the slices. While the configuration of the washer 56 is illustrated as being a serpentine tube, it will be understood that any configuration will suffice, e.g., one U-bend, etc. provided that the wash liquid may be passed in concurrent contact to the raw comestible materials. While the outlet conduit 46 of the blanching tank 32 is indicated as being below the inlet to the collector device 54, it understood that the tank 32 may be positioned above collector device 54 to permit gravity feed of the slices into the collector device 54.

The slurry of slices in washer 56 is passed onto chute 58 from which the slurry is directed onto a first perforated conveyor 60 to separate the slices from a major portion of the liquid including suspended solids. A portion of the suspended solids is collected on a fine mesh conveyor 70 whereas the remaining portion of the suspended solids and wash liquid is collected in tank 62. At this point, fresh wash water may be introduced into the system by directing such wash water from line 64 onto the perforated conveyor 60 or directly into tank 62 provided with a liquid level control (not shown). The slices on conveyor 60 are passed to a second perforated conveyor 66 for further drainage from which the slices are introduced into a deep-fat fryer, generally indicated as F, such as disclosed in the aforementioned copending application for producing potato chips. The wash liquid passing through perforated conveyor 66 is collected on a pan 68 from which it is also passed into tank 62. The conveyor 70 has a smaller mesh size than conveyor 60 to remove fragments from the wash liquid passing to the tank 62.

The starch slurry withdrawn from tank 62 by line 72 under the control of valve 74 is combined in line 76 with a starch slurry in line 44 under the control of valve 78 and is passed by pump 80 through line 82 under the control of valve 84 to a wash liquid treating zone as more fully hereinafter discussed. In such wash liquid treating zone, a concentrated starch slurry and a secondary wash liquid stream having a relatively low concentration of starch are formed, with such secondary wash liquid constituting a portion of the liquid for the wash process and in a preferred embodiment constitutes a major portion thereof. The secondary wash liquid in line 88 under the control of valve 90 may be passed by line 92 to collector 54 by line 51 under the control of valve 53. The starch slurry in line 82 is introduced in parallel flow into a plurality of first stage hydroclones, generally indicated at 100. A concentrated starch slurry is withdrawn in line 102 from the first stage hydroclones 100 and is passed by pump 104 to a plurality of second stage hydroclones, generally indicated as 106. A still further concentrated starch slurry is withdrawn from second stage hydroclones 106 by pump 108 and passed by line 110 to a final stage hydroclone 114. Such hydroclones are known and used by those skilled in the art. The lean wash liquids in lines 116, 118 and 120, withdrawn from the first stage hydroclones 100, the second stage hydroclones 106 and the final stage hydroclone 114, respectively, are combined to form the secondary wash liquid in line 88, as hereinabove described.

A concentrated starch slurry in line 122 is withdrawn from the final hydroclone and is passed to a settling tank, generally indicated as 124, comprised of a conically-shaped and bottomless frame member 128 positioned on a support 130 (such as a skid) and a liner material, e.g., a plastic bag disposed within the frame member 128. After a predetermined time period, the starch settles permitting the decantation of the liquid from the top thereof, which liquid may be returned to a step of the washing process. The liner material may be tied at the top thereof and the frame member 128 removed thereby resulting in a "cast-in-place" block of starch. Such block of starch is readily manageable for disposal or for transport to another processing operation, e.g., for use in the preparation of animal feed or as a pregelatinized starch for snack foods. Generally, the concentrated slurries withdrawn from the final stage hydroclone should have a solids concentration of from about 50 to 80%. Higher concentrations may be achieved however, mechanical means are required to move the material into settling tanks.

The following example is illustrative of conditions for the process of the invention and it is to be understood that the scope of the invention is not to be limited thereby.

EXAMPLE

Dirty potatoes at the rate of 12,000 pounds per hour (in a plant operating for eight hours per day are passed through washer 12 and peeler 20, and sliced in slicer 28 from which the slices are conveyed to collector 54 and contacted with wash water at the rate of 220 g.p.m. The combined stream (10–20% solids of potato slices) is passed through the washer 56 and separated by conveyors 60 and 66 from which the slices are discharged into fryer F, whereas the water stream containing about 85 to 92% of the surface starch (exposed during slicing of the potatoes) is collected in tank 62 and passed by line 88 at the rate of 200 gallons per minute at a pressure of 60 p.s.i.g. to first stage concentrators 100. 15.5 gallons per minute of wash liquid in lines 116 are withdrawn from the first stage concentrators 100 [eight (8) hydroclones]. The concentrated slurry in line 102 is passed to second stage concentrators 106 [two (2) hydroclones] under a pressure of 52 p.s.i.g. for further concentration. 12.2 gallons per minute of wash liquid in line 118 are passed to line 88 with further concentrated slurry formed in concentrators 106 being passed to the final stage concentrator 114. 5 gallons per minute of wash liquid is withdrawn and passed to line 88 with 0.6 gallon per minute of a starch slurry having a concentration of between about 70 to 80% solids being passed to three setting tanks generally indicated as 124. After the shift and about 18 hours, about 95 gallons of liquid are decanted leaving solid starch encased in three plastic bags and weighing about 500 pounds each.

While the invention has been described with reference to the use of three settling tanks, it is understood that one or any plurality of tanks may be used. Additionally, the hydroclone configuration may be varied as would be apparent to one skilled in the art.

For certain applications, the blanching operation may be omitted, in which case the potato slices prepared in slicer 28 are conveyed by line 31 directly to collector 54 for passage through washer 56. While the invention has been described with reference to potato slices as a particulate material, it is understood that other particulate comestibles may be treated as well as whole comestibles, such as peas, string beans, and the like. Water losses in the system are limited to the washing and peeling operations and surface water on the material passed for subsequent treatment. The process of this invention may reduce water requirements by as much as as 96%, while simultaneously producing blocked or bagged solid starch.

Numerous modifications and variations of the invention are possible in light of the above teachings and therefore the invention may be practised otherwise than as particularly described.

I claim:

1. A process for treating a solids-containing liquid stream which comprises:
    (a) passing said solids-containing liquid serially through a plurality of concentration zones;
    (b) passing a concentrated solids-containing slurry to a settling zone provided with a removable liner material;
    (c) decanting liquid from said settling zone; and
    (d) recovering said solids in said removable liner material from said settling zone.

2. The process as defined in Claim 1 wherein said solids-containing liquid stream is a water slurry of starch.

3. The process as defined in Claim 1 wherein said solids are recovered in blocked form.

4. The process as defined in Claim 1 wherein said solids-containing water stream is passed through a plurality of hydroclones.

5. The process as defined in Claim 1 wherein said concentrating zones is comprised of a first stage including a plurality of hydroclones, a second stage including a plurality of hydroclones, and a third stage including a hydroclone.

6. The process as defined in Claim 1 wherein said liquid is returned to a process for treating a particulate material wherein said solids-containing liquid stream is formed.

7. An apparatus for treating a solids-containing liquid stream which comprises:
    (a) a plurality of hydroclones;
    (b) means for passing said liquid stream through said hydroclones to concentrate said liquid stream;
    (c) a settling device provided with a removable liner material;
    (d) means for passing said concentrated liquid stream to said settling device;
    (e) means for removing the liquid phase from the solid phase after the settling of the solids; and
    (f) means for collecting said resulting solids in said removable liner material in blocked form.

8. The apparatus as defined in Claim 7 wherein said plurality of hydroclones is arranged for parallel and serial flow.

9. The apparatus as defined in Claim 7 which said solids-containing liquid stream is a slurry of starch in water.

10. The apparatus as defined in Claim 7 wherein said settling device means includes said removable liner means disposed within a supporting device positioned on a skid.

11. The apparatus as defined in Claim 10 wherein said supporting device is conically-shaped.

12. The apparatus as defined in Claim 11 wherein said supporting device is bottomless.

13. The apparatus as defined in Claim 12 wherein means are provided for lifting said support device from said skid.

14. The apparatus as defined in Claim 13 wherein said removable liner means is a plastic bag.

References Cited
UNITED STATES PATENTS

| | | | |
|---|---|---|---|
| 254,239 | 2/1882 | Roat | 127—27 |
| 717,699 | 1/1903 | Murdoch | 127—27 X |
| 1,832,229 | 11/1931 | McCoy | 127—69 |
| 2,114,497 | 4/1938 | Kelling | 127—27 X |
| 2,536,430 | 1/1951 | Eckers | 127—69 |
| 2,974,068 | 3/1961 | Fontein | 127—24 X |
| 3,079,283 | 2/1963 | Dreissen | 127—24 X |
| 3,273,790 | 9/1966 | Dahlberg | 127—69 X |

MORRIS O. WOLK, Primary Examiner

S. MARANTZ, Assistant Examiner

U.S. Cl. X.R.

127—24, 69; 210—83, 513, 514, 516; 99—403